United States Patent [19]
Betlejewski

[11] 3,982,117
[45] Sept. 21, 1976

[54] ELECTRONIC FLASH UNIT FOR CAMERAS

[75] Inventor: Frank W. Betlejewski, Elgin, Ill.

[73] Assignee: Bell & Howell Company, Chicago, Ill.

[22] Filed: Dec. 16, 1974

[21] Appl. No.: 532,876

[52] U.S. Cl. ............................... 240/1.3; 354/127
[51] Int. Cl.² .......................................... G03B 15/02
[58] Field of Search ................ 354/126, 127, 145; 240/1.3

[56] References Cited
UNITED STATES PATENTS

| | | | |
|---|---|---|---|
| 3,294,002 | 12/1966 | Vitkine | 354/145 X |
| 3,538,822 | 11/1970 | Gilmer | 354/127 X |
| 3,639,997 | 2/1972 | Koeber | 33/221 |
| 3,749,900 | 7/1973 | Jonas et al. | 240/1.3 |

*Primary Examiner*—Fred L. Braun
*Attorney, Agent, or Firm*—John R. Hoffman; John E. Peele, Jr.

[57] ABSTRACT

An electronic flash unit for use with a camera having a manually adjustable aperture lens. The flash unit includes an exposure calculator which uses the principle of triangulation for automatically calculating the correct F stop setting for the adjustable lens. A pendulous indicator is pivotally mounted within the flash unit so as to be adjustable due to gravitational forces when the unit is aligned with the base of the subject through a sighting device on the side of the housing. The indicator is lockable in the adjusted position to indicate the appropriate aperture setting on an F stop scale. The F stop scale also is rotatably mounted on the flash unit to permit the user to rotate the scale to accommodate for the use of various films. The F stop scale is preset according to an ASA film number for the particular speed of the film being used. A stationary foot or centimeter scale also is provided to indicate the position of the subject relative to the camera in feet or centimeter dimensions. An auxiliary light is provided on the flash unit for aiding in visually aligning the flash unit under subdued light conditions.

14 Claims, 8 Drawing Figures

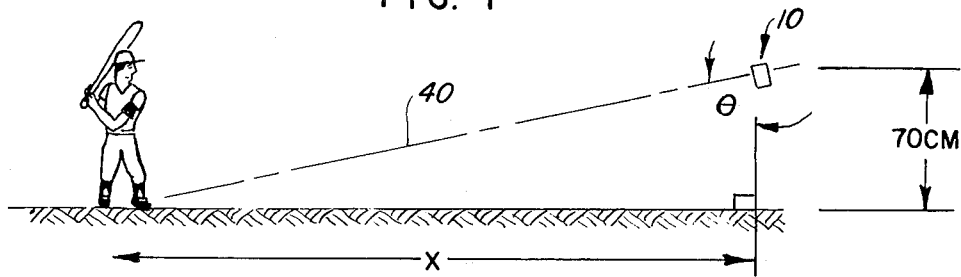
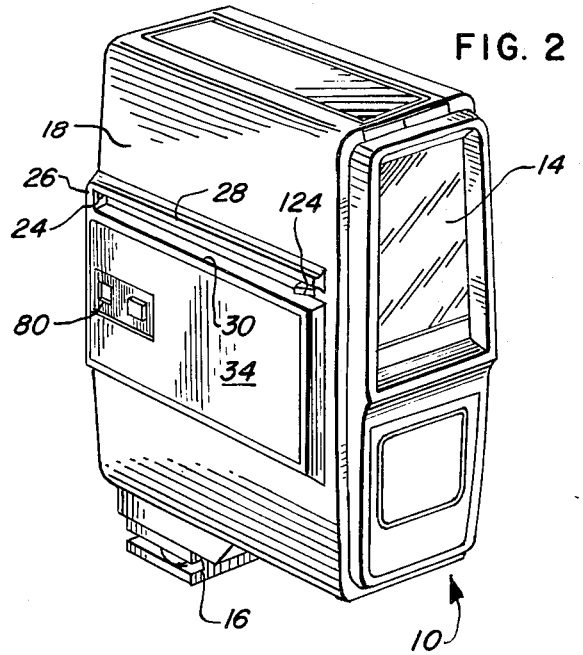
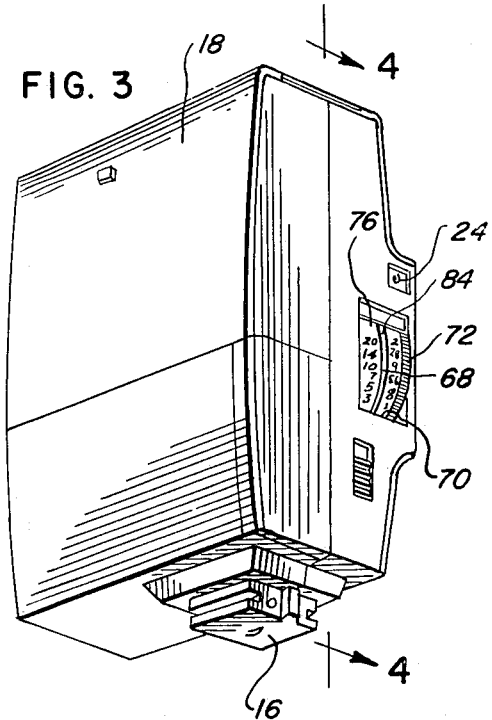
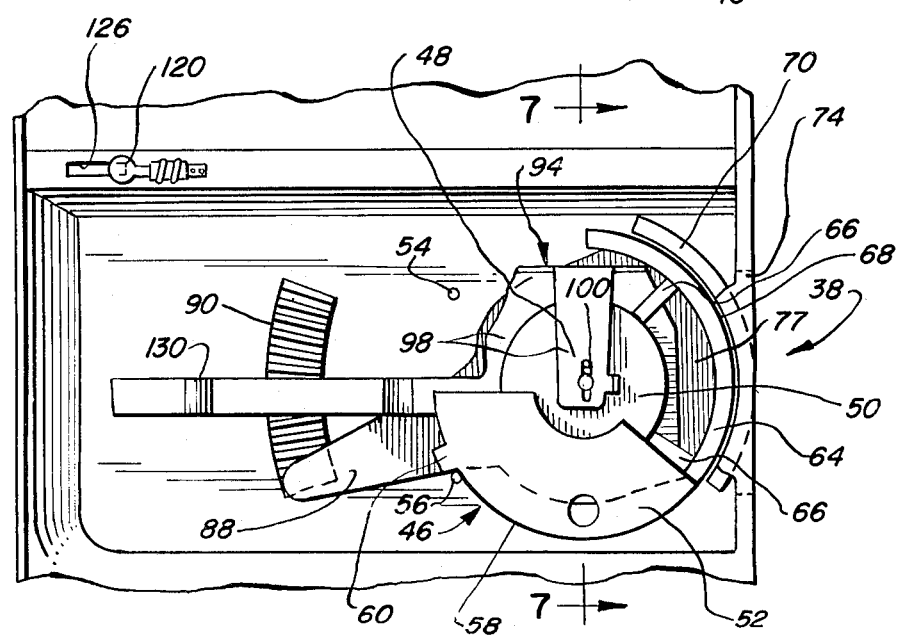

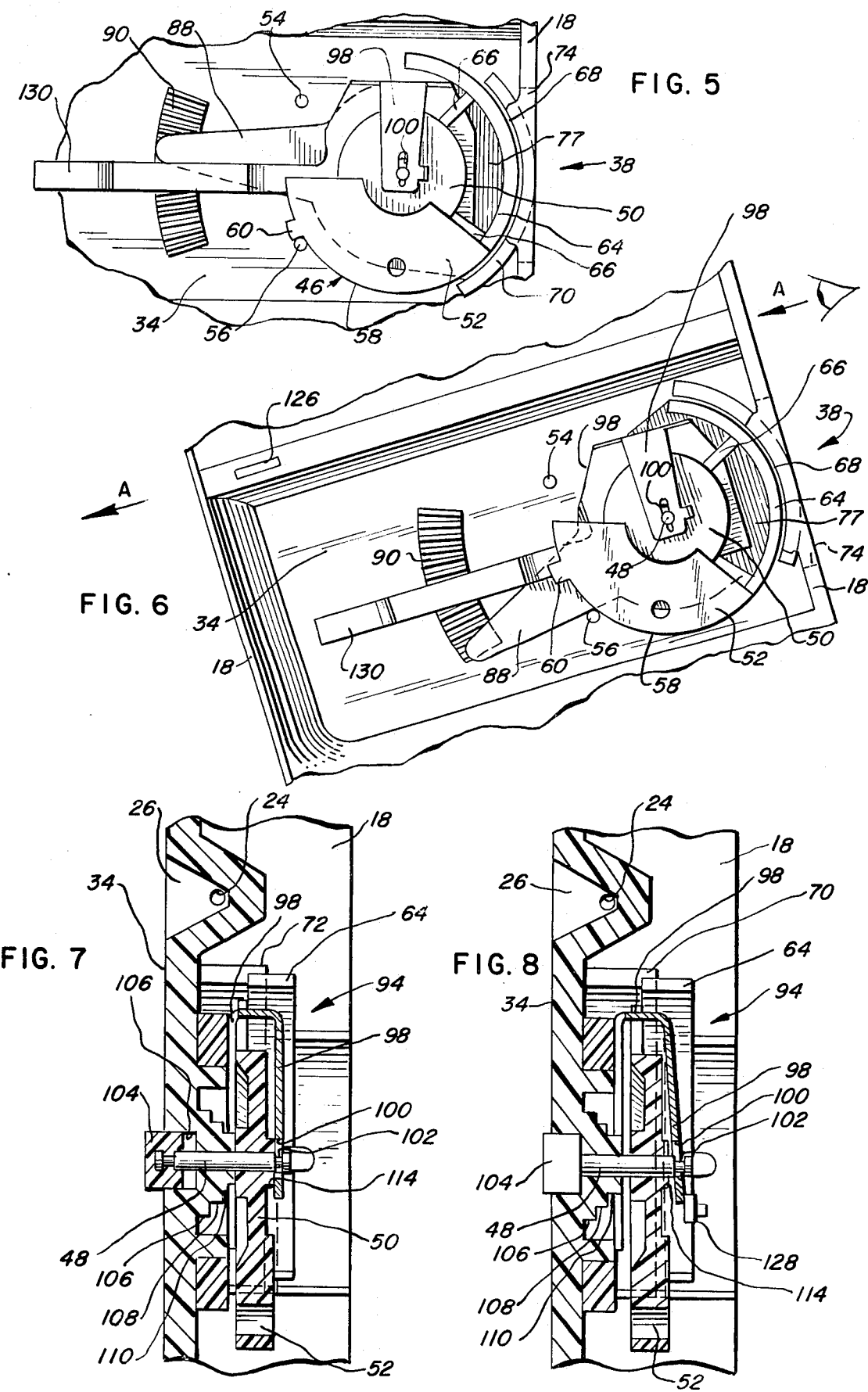

ELECTRONIC FLASH UNIT FOR CAMERAS

BACKGROUND AND SUMMARY OF THE INVENTION

This invention relates to an electronic flash unit having an exposure calculator which uses the principle of triangulation. More particularly, the invention relates to an exposure calculator having a presettable scale for automatically calculating the appropriate aperture or "F stop" to be preset on the camera for a desired subject.

Range finding devices which use the principle of triangulation for determining the distance between the camera and a subject are well known in the art. Some of such previous devices have used a pendulous indicator which when released will swing due to gravitational forces to cause an indicating needle to align relative to a predetermined foot scale and thereby calculate the camera-to-subject distance directly in feet. Other improvements also have been made which permit the range finding device to accommodate for variations in the type of flashbulb or light used, the type of reflector used, the type of film used and the shutter speed setting of the camera. However, in most instances, the operator has been required to convert the camera-to-subject feet dimension into a correct F stop number corresponding to the particular film used.

According to the present invention, the exposure calculator uses a similar principle of triangulation, but automatically converts the camera-to-subject distance to a particular F stop setting corresponding to the speed of the film being used. The F stop indicating scale is rotatably mounted on the housing of the flash unit to permit a predetermined relative setting of the F stop scale for a particular ASA film speed number. After this setting, the flash unit is aligned through a viewer with the base of the subject to be photographed. An actuating button is depressed to free the pendulous indicator which rotates relative to the F stop scale due to the influences of gravity. The actuating button then is released to lock the indicator into position thereby indicating the correct F stop setting for the camera lens. The flash unit also is provided with an auxiliary light to aid the user in aligning the flash unit with the base of the subject. This light is illuminated only while the actuating button is depressed.

It is an object of this invention to provide a new and improved electronic flash unit having a built in exposure calculator including the foregoing improvements which will be efficient in use, durable, and which can be manufactured for a reasonable cost.

In accordance with the present invention, the flash unit is mounted within a housing with an internal power source. The exposure calculator device also is mounted within the housing, including sighting means on the housing for alignment in the desired angular orientation. The sighting means includes auxiliary light means connected to the power source for aiding in visual alignment. A pendulous indicator is rotatably supported in the housing for movement, due to the influence of gravity, relative an F stop scale for indicating the correct exposure. The F stop scale is rotatably mounted with respect to the housing to permit adjustment of the scale to acommodate varying types of films. An actuating button is connected to the auxiliary light means for turning the light means off and on and for selectively stopping reltive movement of the indicator with respect to the F stop scale. The actuating button is movable between a depressed position, wherein the light is illuminated and the indicator is free to rotate according to the dictates of gravity, and a released position, wherein the light means is not illuminated and the indicator is locked relative to the F stop scale for observance by the user.

BRIEF DESCRIPTION OF THE DRAWINGS

FIG. 1 is a perspective view illustrating the elements involved in the principle of triangulation as used in the present embodiment of the flash unit contemplated by the present invention;

FIG. 2 is a front perspective view of the flash unit embodying the concepts of the present invention;

FIG. 3 is a rear perspective view of the flash unit embodying the concepts of the present invention;

FIG. 4 is a partial vertical section, on an enlarged scale, taken generally along the line 4—4 of FIG. 3;

FIG. 5 is a vertical section similar to FIG. 4 showing the movable scale in another position;

FIG. 6 is another vertical section similar to FIG. 4 showing the flash unit oriented in a generally downward position illustrating the visual sighting means;

FIG. 7 is a partial vertical section of the flash unit illustrating the actuating means in its released position, taken generally along the line 7—7 of FIG. 4; and FIG. 8 is a vertical section similar to FIG. 7 showing the actuating means in its depressed position.

DESCRIPTION OF THE PREFERRED EMBODIMENT

The electronic flash unit, including the exposure calculator, of the present invention is shown in FIGS. 2 and 3, generally designated 10. The flash unit 10 includes a conventional electronic flashbulb behind a safety screen or window 14 (FIG. 2) mounted on the front of the unit. The flash unit 10 also includes a standard mounting member or foot 16 which is adapted to fit a conventional or "hot foot" mount on a camera. A generally rectangular housing 18 surrounds the components of the electronic flash unit and provides a mount for the exposure calculator of the present invention.

The individual elements of the exposure calculator are mounted to the lefthand side of the housing 18 (as seen in FIG. 2) and include the movable components shown and described with reference to FIGS. 4 through 8. Referring to FIG. 2, a sighting aperture or reference 24 is provided on the left side of the housing 18 within a horizontally extending flange 26. The direction of alignment or sighting is defined by an elongated channel between an upper longitudinal rib 28 and the upper edge 30 of a raised housing portion or enlarged boss 34 (FIG. 2). The area behind the boss 34 generally encloses the component parts of the exposure calculator, generally designated 38 (FIG. 4).

The physical laws applicable to the principle of triangulation as used in the present exposure calculator are illustrated in FIG. 1. The exposure calculator, within the electronic flash unit 10, is held approximately at eye level by the particular person using the camera. This dimension, while not being constant for all photographers, is shown to be approximately 70 centimeters (FIG. 1). The line of sight 40, also shown as arrow A in FIG. 6, to the foot or base of the subject to be photographed causes the flash unit 10 to be oriented at a particular angle theta with respect to a vertical line with the ground. The calculator, with this information (the angle theta the right angle with the ground, and the vertical height 70 centimers), then can compute the distance X to determine the camera-to-subject distance. When the camera-to-subject distance is known, the F stop or aperture setting for a particular camera and film speed is a constant and can be read directly from the exposure calculator, as will be described hereinafter.

Referring to FIGS. 4 through 8, the exposure calculator includes a pendulous indicator, generally designated 46. The pendulous indicator 46 is pivotally mounted upon a generally horizontal axis provided by an axle 48. The indicator includes a central disc portion 50 which supports a lower, semi-circular weighted portion 52 which controls the movement of the indicator due to the dictates of gravitational forces. Two pins 54 and 56 are provided on the inside surface of the raised boss 34, on a radius about the axle 48 so as to be adjacent the outer peripheral annular surface 58 of the weighted portion 52. The weighted portion 52 carries a tab 60 for engagement with the pins 54 and 56 to limit the rotation of the indicator 50 to approximately 60°. The indicator also carries an arcuate shoe portion 64 which is displaced from and mounted to the disc by a plurality of tabs 66. The arcuate shoe 64 includes an index point or depression 68 which indicates the correct distance and F stop to be used for a particular situation as described hereinafter. The index point is observable on the rear of the flash unit 10 as seen in FIG. 3.

Referring to the back of the flash unit 10, as seen in FIG. 3, two scales are provided on the exposure calculator. The righthand scale 70 is pivotally mounted by the axle 48 and includes a thumb wheel portion 72 which extends through an aperture 74 in the rear of the housing to permit relative movement of the scale 70. A second scale 76, to the left in FIG. 3, is provided with indicia indicating the distance of the subject in feet or centimeters. The distance scale 76 is stationary at all times. As is known in the photographic art, the particular F stop or aperture setting for the camera is a function of the distance, shown on the scale 76, and the film speed, which is commonly measured in ASA film numbers. In the particular embodiment of the exposure calculator 38 of the present invention, the thumb wheel 72 permits the F stop scale 70 to be moved relative to the distance scale 76 to accommodate for the use of films having different film speeds, the coordinating factor being designated as an ASA film number. The F stop scale 70 is mounted on a generally triangular member 77 for rotatable mounting on the axle 48 (FIG. 4). This triangular member 77 carries indicia representative of the ASA film speed number which is observable through the aperture 80 on the side of the boss 34 on the housing (FIG. 2). Thus, the F stop scale 70 can be moved relative to the distance scale 76 to accommodate the ASA film numbers between approximately 25 to 400. Therefore, for a particular film speed, the correct F stop number on the scale 70 will appear adjacent its corresponding camera-to-subject distance shown on the scale 76. The index 68 is viewable through a slot 84 between the scales 70 and 76. This index 68 is movable with the indicator 46 as previously described. The triangular portion 77 which mounts the movable scale 70 includes a tab portion 88 which extends toward the front of the flash unit, as shown in FIG. 4. This tab 88 includes a notch (not shown) which engages an arcuate sawtooth surface 90 mounted on the inside of the housing boss 34 to maintain the movable scale 70 in any predetermined position. Rotational movement of the scale 70 also is limited by the pins 54 and 56 as the sides of the tab 88 engage the pins.

Actuating means, generally designated 94, is provided to permit the pendulous indicator to rotate about the axle 48 during alignment of the flash unit 10 with the base of the subject. The actuating means also locks the pendulous indicator 46 in a preset orientation so that the camera and flash unit 10 can be focused on the subject along a horizontal plane. More particularly, the actuating means 94, referring to FIG. 7 and 8, includes a generally U-shaped, conductive, resilient member 98 for clamping the pendulous indicator 46. The resilient member 98 includes an aperture 100 which engages a reduced annular groove 102 on the axle 48. The opposite end of the axle 48 includes an actuating button 104 which is slidably mounted within a rectangular opening 106 in the boss 34 of the housing 18. The axle 48 is free to slide along its axis when the button 104 is manually depressed. A plurality of stepped portions 106, 108 and 110 are formed integrally with the boss 34 to support the axle 48 and mount the resilient clamping member 98. The disc portion 50 of the indicator includes a substantially reduced annular surface 114 for engagement with the resilient member 98. Thus, in the position as shown in FIG. 7, the resilient member 98 engages the annular surface 114 and "pinches" or locks the indicator 46 between its two downwardly directed portions as shown in FIG. 7. When it is desirable to permit the indicator 46 to rotate, as when aligning the calculator as shown in FIG. 6, the actuating button 104 is depressed to free, or unlock, the indicator 46. Referring to FIG. 8, as the actuating button 104 is depressed, it flexes one arm of the resilient member 98 outwardly and frees the indicator 46 for rotation about the shaft 48. Gravitational forces then cause the indicator to rotate and the actuating button 104 is released once the user sights the base or foot of the subject to be photographed. Once the button 104 is released, as described, the indicator 46 is locked in position, and the camera-to-subject distance as well as the corresponding F stop aperture setting can be read directly adjacent the index point 68 on the indicator shoe 64. Therefore, with one simple aiming and depressing and releasing of the actuating button 106, the user of the exposure calculator can immediately read the correct F stop setting for the particular subject.

To aid a photographer when taking pictures in a subdued lighting situation, an auxiliary light means is provided on the electronic flash unit for aiming at the base or foot of the subject. The light means includes a bulb 120 (FIG. 4) which illuminates a clear plastic tab 124 (FIG. 2). The tab 124 is mounted within an aperture 126 in the side of the housing 18. Even in the darkest lighting situation the photographer can easily sight the base of the subject directly off of the end of the tab 124 by sighting through aperture 24. Since it is desirable that this light be illuminated only during the orientation or sighting operation, the resilient member 98 is used to energize the light. As the button 104 is depressed, as seen in FIG. 8, the tab 98 will engage a contact 128 and establish electrical contact through a long tab 130 between the power supply for the electronic flash unit and the auxiliary lightbulb 120 used for triangulation alignment. Therefore, when the actuating button 104 is released, the light will not be illuminated and the indicator will be locked in position.

The foregoing detailed description has been given for clearness of understanding only and no unnecessary limitations should be understood therefrom as some modifications will be obvious to those skilled in the art.

I claim:

1. In a flash unit having a housing and a power source mounted therein, an exposure calculator comprising:

sighting means mounted on said housing for aligning said housing in a desired angular orientation relative to the ground;

an indicator means including a first movable member supported on said housing for free movement relative to said housing under the influence of gravity, said first movable member including an index portion alignable with indicia on the housing representative of aperture settings, whereby the angular orientation of the housing caused by aiming the flash unit at an object by means of said sighting means serves to move said index relative to said indicia to indicate the proper aperture setting; and actuating means operatively associated with said first movable member for selectively restraining movement thereof, said actuating means being mounted on said housing and movable between a first position wherein the first movable member is free to move under the influence of gravity and a second position wherein the first movable member is restrained and held in its assumed orientation so that the proper aperture setting can be determined by the relative positioning of said index portion and said indicia.

2. The flash unit of claim 1 wherein said indicia is carried by a second, selectively, movable member for adjusting the position of the indicia relative to the indicator index as a function of film speed.

3. The flash unit of claim 2 wherein said second movable member also includes indicia thereon representative of film speed in ASA numbers to permit proper positioning of the second movable member with respect to the indicator index for the particular ASA film speed number of the film being used.

4. The flash unit of claim 1 wherein the exposure calculator includes a second set of indicia on the housing representative of camera-to-subject distance whereby the angular orientation of the housing caused by aiming the flash unit serves to move said index relative to the second set of indicia to indicate the camera-to-subject distance.

5. The flash unit of claim 1 wherein the sighting means includes light means connected to said power source for aiding in visually aiming the flash unit.

6. The flash unit of claim 5 wherein the actuating means is connected to said light means for turning said light means on and off, whereby said light means is illuminated when said actuating means is in said first position and the light means is turned off when said actuating means is in said second position.

7. The flash unit of claim 5 wherein said sighting means includes a reference aperture spaced from said light means through which the light means can be visually aligned to assure proper aiming of the flash unit.

8. In a flash unit having a housing and a power source mounted therein, an exposure calculator comprising;

sighting means mounted on said housing for aligning said housing in a desired angular orientation relative to the ground, said sighting means including light means connected to said power source for aiding in visually aiming the flash unit;

an indicator means including a first movable member supported on said housing for free movement relative to said housing under the influence of gravity, and a second, selectively movable member having a first set of indicia thereon representative of aperture settings and a second set of indicia representative of film speed, said first movable member having an index alignable with said first set of indicia on the second movable member, whereby said second movable member is associated with said first movable member for adjusting the orientation of said first set of indicia relative to the index as a function of the speed of the film so that the angular orientation of the housing caused by aiming the flash unit at an object serves to move said index relative to said first set of indicia to indicate the proper aperture setting associated with the predetermined film speed; and actuating means connected to said light means for turning said light means on and off and operatively associated with said first movable member for selectively restraining the free movement thereof, said actuating means being mounted on said housing and being selectively movable between a first position wherein said light means is illuminated and the first movable member is free to rotate and a second position wherein said light means is turned off and said first movable member is restrained and held in its assumed orientation so that a proper aperture setting can be observed by the aligned index and indicia.

9. The flash unit of claim 8 wherein the exposure calculator includes a set of indicia on the housing adjacent the movable index representative of camera-to-subject distance whereby the angular orientation of the housing caused by aiming the flash unit serves to move said index relative to said indicia to indicate the camera-to-subject distance.

10. The flash unit of claim 8 wherein said sighting means includes a reference aperture spaced from said light means through which the light means can be visually aligned to assure proper aiming of the flash unit.

11. In a flash unit having a housing and a power source mounted therein, an exposure calculator comprising:

a support axle on said housing and having manually operable actuating means at one end exposed on the outside of the housing for manually displacing said support axle longitudinally relative to said housing;

a pendulous member supported on said housing by said support axle for free pivotal movement under the influence of gravity to an adjusted orientation;

resilient means positioned, when in a first position, for engagement with said pendulous member to restrain said member against movement about said support axle, said resilient means being movable to a second position by manual actuation of said actuating means and longitudinal displacement of said support axle to provide for free movement of said pendulous member about said axle under the influence of gravity; and an index on the pendulous member for alignment with indicia on the housing representative of aperture settings, whereby the angular position of the housing serves to move said pendulous member and thereby said index relative to said indicia to indicate the proper aperture setting when the resilient means is moved to its second position by said actuating means.

12. The flash unit of claim 11 including sighting means mounted on said housing for aligning said housing in a desired angular orientation relative to the ground, said sighting means including light means connected to said power source for aiding in the visual aiming of the flash unit.

13. The flash unit of claim 11 wherein said indicia is carried by a selectively movable member adjacent the path of travel of said index, for adjusting the position of the indicia relative to the index as a function of film speed.

14. The flash unit of claim 13 wherein said selectively movable member also includes indicia thereon representative of film speed in ASA numbers to permit proper positioning of the selectively movable member with respect to the index for the particular ASA film speed number of the film being used.

* * * * *